Nov. 24, 1953     I. BENKOE     2,659,977
DEVICE FOR ACCURATELY SETTING CALIPERS
Filed June 19, 1952
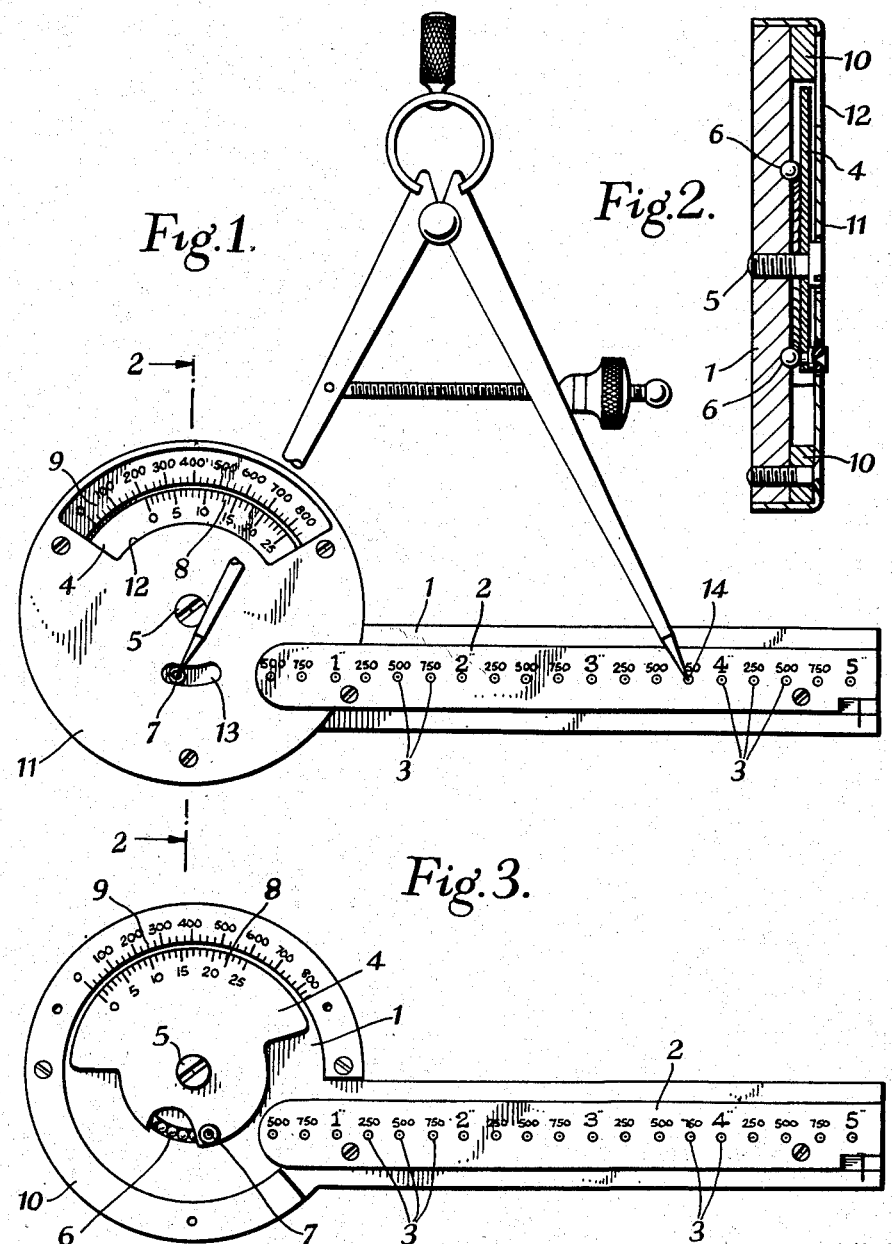
INVENTOR
IVAN BENKOE Patented Nov. 24, 1953

2,659,977

UNITED STATES PATENT OFFICE 2,659,977

DEVICE FOR ACCURATELY SETTING CALIPERS

Ivan Benkoe, Hampstead, London, England

Application June 19, 1952, Serial No. 294,338

Claims priority, application Great Britain July 24, 1951

2 Claims. (Cl. 33—107)

This invention relates to a device for setting calipers or dividers (hereinafter called "calipers") with micrometer accuracy to any desired dimension. To transfer measurements to a work piece requires a precision instrument. In the work shop if a jig-boring machine is not available, slip gauges or height gauges are used, but this procedure is tedious and expensive and involves a loss of time. Many attempts have been made to perfect a direct-reading caliper without, however, success. The devices proposed were too complicated and owing to the large number of sources of error the high accuracy desired could not be obtained. Furthermore, re-sharpening of the points put the caliper out of adjustment. The present invention has for its object to overcome these disadvantages and to provide a very simple and efficient device by means of which calipers may be adjusted to any desired dimension with micrometer accuracy.

The device for accurately setting calipers according to the present invention comprises a base plate provided with a plurality of equally spaced indentations in line with one another, a movable member having an indentation in line or substantially in line with the fixed identations capable of movement over a distance at least equal to the fixed interval of the spacing of the indentations, and a scale to indicate the amount of movement of the movable member.

Preferably the device comprises a base plate carrying a ruler plate provided with a line of indentations spaced apart at fixed intervals, a disc or the like pivotally mounted on said base plate having an indentation lined up with the indentations of the ruler plate and vernier scales carried by the base plate and the edge of the disc or the like to indicate the movement of the indentation in the disc or the like.

In order that this invention may be the more clearly understood and readily carried into effect, reference may be made to the accompanying drawings which illustrate by way of example the preferred embodiment of this invention, and in which:

Figure 1 is an elevation of the device showing the manner in which the same is used, Figure 2 is a section on line 2—2 of Figure 1, and Figure 3 is an elevation of the device with the cover plate removed.

Referring now to the accompanying drawings, the device for accurately setting calipers therein illustrated comprises a base plate 1 carrying a ruler plate 2 provided with a plurality of indentations 3 arranged in line with one another and accurately spaced at fixed intervals of, say, ¼". The indentations 3 are, of course, such that the caliper point may be accurately located therein whilst at the same time giving the necessary clearance for the caliper point. A disc 4 is pivotally mounted on the base plate as at 5, a ring of ball-bearings 6 preferably being arranged between the disc 4 and the base plate 1 to ensure free movement of the disc and to prevent its sensitivity being impaired by axial pressure on the bearing. The disc 4 is provided with a socket or indentation 7, of a similar nature to the indentations 3, lined up with the indentations 3, and the edge of the disc 4 is provided with a vernier scale 8 co-operating with a scale 9 on a ring 10 secured to the base plate about the disc. The disc 4 and ring 10 are covered by a cover plate 11 having a window 12 through which the scales 8 and 9 may be viewed and a slot 13 to allow for movement of the socket. The scales 8 and 9 are graduated to cover a movement of the socket 7 equal to the fixed interval between the indentations 3 and are preferably arranged to give readings in thousandths. It will be seen that the socket 7 is nearer to the pivot 5 than the scales 8 and 9 whereby an enlarged scale may be used and an easier reading obtained.

The ruler plate 2 is preferably hardened or chromium plated in order to avoid loss of accuracy due to wear and tear.

In use, one point 14 of the caliper is inserted in the indentation corresponding to the nearest measurement to that desired on the low side, and the other point of the calipers is inserted in the socket 7. The caliper is then adjusted until the required reading is given on the vernier scales 8 and 9. Thus, for example, to set the caliper to a dimension of 3.970 inches, one end of the caliper is placed in that indentation 3 corresponding to 3.750 inches as shown in Figure 1 and the other point of the caliper is placed in the socket 7. The caliper is then adjusted until the vernier scale shows .220 inch, so that 3.750+.220 gives the required dimension of 3.970.

It will be appreciated that as the socket 7 moves in an arc about the pivot 5 there will be a small inaccuracy in the reading. Even when using the first indentation on the ruler plate, i. e. for small caliper settings, this will only be of the order of 2.5 ten-thousandths of an inch, and this error will progressively decrease on larger caliper settings so that for all settings it is quite simple to obtain an accuracy of the order of 5 ten-thousandths of an inch which is a higher degree of accuracy than will be required.

In place of the vernier scale arrangement previously described it is, of course, possible to use a dial gauge or other similar device for accurately measuring the movement of the socket relative to the ruler plate.

For metric scales the indentations would be suitably spaced on the ruler plate 2, say at 10 millimetre intervals and the vernier would have a 10 millimetre capacity.

Of course, for setting inside calipers the indentations would be replaced by pegs or the like and reference herein to "indentations" must be read as including the modified form of device in which the caliper legs are engaged by pegs or the like.

The device according to the present invention is simple and cheap to produce and will render excellent service in the work shop and drawing office, it being a useful supplement to the existing measuring devices. It is without appreciable source of error and the shape or size of the caliper will in no way affect its accuracy which will remain constant almost indefinitely.

I claim:

1. A device for accurately setting calipers comprising a base plate carrying a ruler plate provided with a line of conical indentations spaced apart at fixed intervals, a disc pivotally mounted in said base plate having a conical indentation lined up with the conical indentations of the ruler plate and means co-operating with said disc to indicate the movement of the same.

2. A device for accurately setting calipers comprising a base plate carrying a ruler plate provided with a line of conical indentations spaced apart at fixed intervals, a disc pivotally mounted in said base plate having a conical indentation lined up with the conical indentations of the ruler plate, and vernier scales carried by the base plate and the edge of the disc to indicate the amount of movement of the conical indentation in the disc, the conical indentation in the disc being spaced from the pivot point by a distance less than that separating the vernier scales from the pivot point.

IVAN BENKOE.

References Cited in the file of this patent

UNITED STATES PATENTS

| Number | Name | Date |
|---|---|---|
| 2,241,692 | Williams | May 13, 1941 |
| 2,612,690 | Cotton | Oct. 7, 1952 |